(12) United States Patent  (10) Patent No.: US 8,528,400 B2
Luce  (45) Date of Patent: Sep. 10, 2013

(54) AIRCRAFT SHOCK STRUT HAVING A FLUID LEVEL MONITOR

(75) Inventor: William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 1016 days.

(21) Appl. No.: 12/569,699

(22) Filed: Sep. 29, 2009

(65) Prior Publication Data

US 2010/0017052 A1 Jan. 21, 2010

Related U.S. Application Data

(63) Continuation-in-part of application No. 11/458,909, filed on Jul. 20, 2006.

(60) Provisional application No. 60/702,403, filed on Jul. 26, 2005.

(51) Int. Cl.
G01F 23/22 (2006.01)

(52) U.S. Cl.
USPC .................... 73/304 R; 73/293; 116/227

(58) Field of Classification Search
USPC .............................. 73/293, 304 R
See application file for complete search history.

(56) References Cited

U.S. PATENT DOCUMENTS

| | | | |
|---|---|---|---|
| 3,535,933 A | 10/1970 | Pliml | |
| 3,948,359 A | 4/1976 | Rogers | |
| 4,092,947 A | 6/1978 | Labrecque | |
| 4,155,013 A | 5/1979 | Spiteri | |
| 4,713,552 A | 12/1987 | Denis et al. | |
| 4,978,850 A | 12/1990 | Nakamura et al. | |
| 5,058,420 A * | 10/1991 | Vali et al. | 73/49.2 |
| 5,095,517 A | 3/1992 | Monguzzi et al. | |
| 5,996,979 A | 12/1999 | Hrusch | |
| 6,032,090 A | 2/2000 | von Bose | |
| 6,244,398 B1 | 6/2001 | Girvin et al. | |
| 6,767,249 B1 | 7/2004 | Li | |
| 7,552,803 B2 | 6/2009 | Luce | |
| 2002/0124643 A1 | 9/2002 | Robinson | |
| 2003/0019292 A1 | 1/2003 | Robinson et al. | |
| 2004/0129834 A1 * | 7/2004 | Luce | 244/100 R |

* cited by examiner

Primary Examiner — Hezron E Williams
Assistant Examiner — Paul West
(74) Attorney, Agent, or Firm — Snell & Wilmer L.L.P.

(57) ABSTRACT

A system for monitoring a liquid level in an aircraft shock strut includes a cylinder having an internal chamber sealed by a piston telescopically movable within the cylinder. The chamber contains a gas and a liquid, and a sensor assembly is provided for monitoring a condition of a level of the liquid in the chamber. The sensor assembly includes at least one probe within the chamber, and a fitting assembly allows one or more leads from the probe to pass through the wall of the strut while maintaining pressure in the chamber. The fitting assembly includes a plug molded to the one or more leads extending from the probe. The fitting assembly also includes a retainer for holding the plug in sealed relationship with a through passage in the strut.

8 Claims, 10 Drawing Sheets

AIRCRAFT SHOCK STRUT HAVING A FLUID LEVEL MONITOR

PRIORITY CLAIM

This application claims priority to co-pending, commonly owned U.S. patent application Ser. No. 11/458,909 (filed on Jul. 20, 2006), which claims priority to U.S. Provisional Patent Application No. 60/702,403 (filed on Jul. 26, 2005), and wherein the subject matter for each of these patent applications is incorporated herein by reference in their entirety.

FIELD OF INVENTION

The present invention relates to aircraft shock struts for absorbing and damping shock forces, such as during landing, taxiing or takeoff, and particularly to an "air-over-oil" shock strut.

BACKGROUND OF THE INVENTION

Shock absorbing devices are used in a wide variety of vehicle suspension systems for controlling motion of the vehicle and its tires with respect to the ground and for reducing transmission of transient forces from the ground to the vehicle. Shock absorbing struts are a common and necessary component in most aircraft landing gear assemblies. The shock struts used in the landing gear of aircraft generally are subject to more demanding performance requirements than most if not all ground vehicle shock absorbers. In particular, shock struts must control motion of the landing gear, and absorb and damp loads imposed on the gear during landing, taxiing and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, such as a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Over time the gas and/or oil may leak from the telescoping cylinders and cause a change in the performance characteristics of the strut. Presently, there is no reliable method of verifying the correct servicing parameters of aircraft shock struts. While gas pressure can be readily monitored, it cannot be readily determined if a loss in gas pressure arose from leakage of gas alone or from leakage of both gas and oil, unless external evidence of an oil leak is noticed by maintenance personnel. If a low pressure condition is detected in the absence of external evidence of an oil leak, maintenance personnel heretofore would restore the gas pressure to a prescribed level by adding gas. This, however, eventually leads to degraded performance of the shock strut if oil had indeed escaped from the strut. Even if evidence of an oil leak is observed, maintenance personnel cannot easily determine how much oil remains or whether the remaining amount of oil meets specifications or is acceptable for operation.

Two methods can be used to determine whether a strut has the correct pneumatic charge. One method is to jack-up the aircraft to take the weight off of the struts such that each strut is fully extended. The proper pressure that corresponds to the extended position of the strut is a known value. In the other method the pressure is measured with the aircraft supported by the strut using a pressure gauge and the stroke is measured to determine the extension of the strut. Variations in the weight of the aircraft and the position of the center of gravity cause the strut to sit at a variety of strokes in this situation. A look-up table or chart is then used to verify that the stroke and the pressure match an acceptable value. Since jacking the aircraft is rarely done and is very time consuming, the method of verifying the pressure with the aircraft supported by the strut in a static position is most commonly used. This latter technique, however, is not a very reliable way to check the oil level.

The only reliable way to know that the oil level is acceptable is to vent the pneumatic charge and pump oil through the strut to ensure a proper oil level. The strut can then be re-inflated with gas to the proper pressure. This operation takes a significant amount of time, and as a result maintenance personnel may skip this step and only correct the pressure by adding or venting gas. In addition, neither technique enables detection of the oil level while the aircraft is in flight.

SUMMARY OF THE INVENTION

The present invention provides a shock strut that includes a probe for detecting a condition of a liquid level in the strut. Thus maintenance personnel or perhaps even a flight crew, can readily ascertain whether the liquid level in the strut is within acceptable parameters and can monitor the liquid level for leaks. In addition, the present invention provides a sensor assembly having such a probe that can be removed from the strut as a unit, thereby facilitating repair and maintenance of the sensor assembly.

In particular, the present invention provides an aircraft shock strut that includes a cylinder, and a piston telescopically movable within the cylinder. The piston and the cylinder define a sealed chamber that is partially filled with a liquid and partially filled with a gas. The strut also includes at least one probe associated with the chamber for sensing a condition of a level of liquid in the chamber.

The strut may be part of a system that further includes a processor in communication with the probe for processing a signal from the probe related to the level of liquid in the chamber. The strut may include a cable that passes through a wall of the strut for connecting to the probe, such as an optical fiber cable. A fitting assembly engages the cable and seals a passage through the strut wall to the chamber. The fitting assembly preferably includes a plug molded around the cable and a retainer for holding the plug in sealed relationship with a through passage in the strut. The cable may include at least one optical fiber or a plurality of optical fibers that have transversely spaced apart, coextending portions, each of which is surrounded in sealed relationship by the plug that has been molded thereto. The shock strut may include two probes, a first one of which detects a first condition of the liquid level and a second one of which detect a second condition of the liquid level.

The probe and cable may be assembled together as a unit that is removable as a unitary piece from the strut. The strut may also include a guide tube mounted within the chamber so that the unit at least partially extends through and is located by the guide tube.

The present invention also provides a method of monitoring a condition of a liquid level in an aircraft shock strut. The method includes the steps of receiving a signal related to the liquid level from at least one probe of a shock strut, and processing the signal to determine a characteristic of the liquid level in the strut.

The monitoring system provided by the present invention also may allow personnel removed from the landing gear and the strut, such as a pilot, to check a condition of the liquid level, such as whether the level of liquid is below a specified minimum in the strut, either after takeoff and before the landing gear is retracted or after extending the strut for landing but before the aircraft touches down on the runway. At that point the strut is not under load and is fully extended and reliable readings can be taken that will indicate whether the liquid level in the strut is acceptable. In addition or alternatively, the data may be stored for later retrieval by maintenance personnel.

In one aspect of the invention, a method of checking for damaged optical fibers or sensors in a liquid level sensing system includes the steps of (1) transmitting a light beam down a first fiber that is optically coupled to a second fiber by a reflecting mechanism; (2) reflecting the light beam from the reflecting mechanism through the second fiber toward a light sensor; and (3) determining whether at least one of the fibers or sensors are damaged by: (a) checking a first reading of the light sensor when probe tips of both the first and second fibers are not submerged in a liquid; (b) checking a second reading of the light sensor when the probe tips are knowingly submerged in the liquid; and (c) comparing the first reading to the second reading.

In another aspect of the invention, a method of monitoring a liquid level in an aircraft shock strut of a landing gear system includes the steps of (1) detecting a liquid level with a plurality of probes that extend into the shock strut, the plurality of probes having at least a first probe extending by a first distance and a second probe extending by a different distance into the shock strut, each probe having a probe tip with a respective liquid level sensitivity range; (2) transmitting signals from the probes to a processor, the signals indicative of a present level of the liquid; (3) determining whether the liquid level is between the sensitivity range of the first probe tip; (4) when the liquid level is within the sensitivity range of the first probe tip, monitoring an amount of time required for the liquid level to transition from one probe tip to about the other probe tip; and (5) based on the amount of time, estimating a liquid loss rate per flight.

In yet another aspect of the invention, a system for detecting damaged optical fibers or sensors in a liquid level sensing system includes a light sensor; a reflecting mechanism; first and second fibers optically coupled together through the reflecting mechanism, the fibers configured to reflect a light beam from the reflecting mechanism toward the light sensor; and a processor to determine whether at least one of the fibers or sensors are damaged by (1) processing a first signal received by the light sensor when the probe tips of both fibers are not submerged in a liquid; (2) processing a second signal received by the light sensor when the probe tips of both fibers should be knowingly submerged in the liquid; and then (3) comparing the processed signals.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
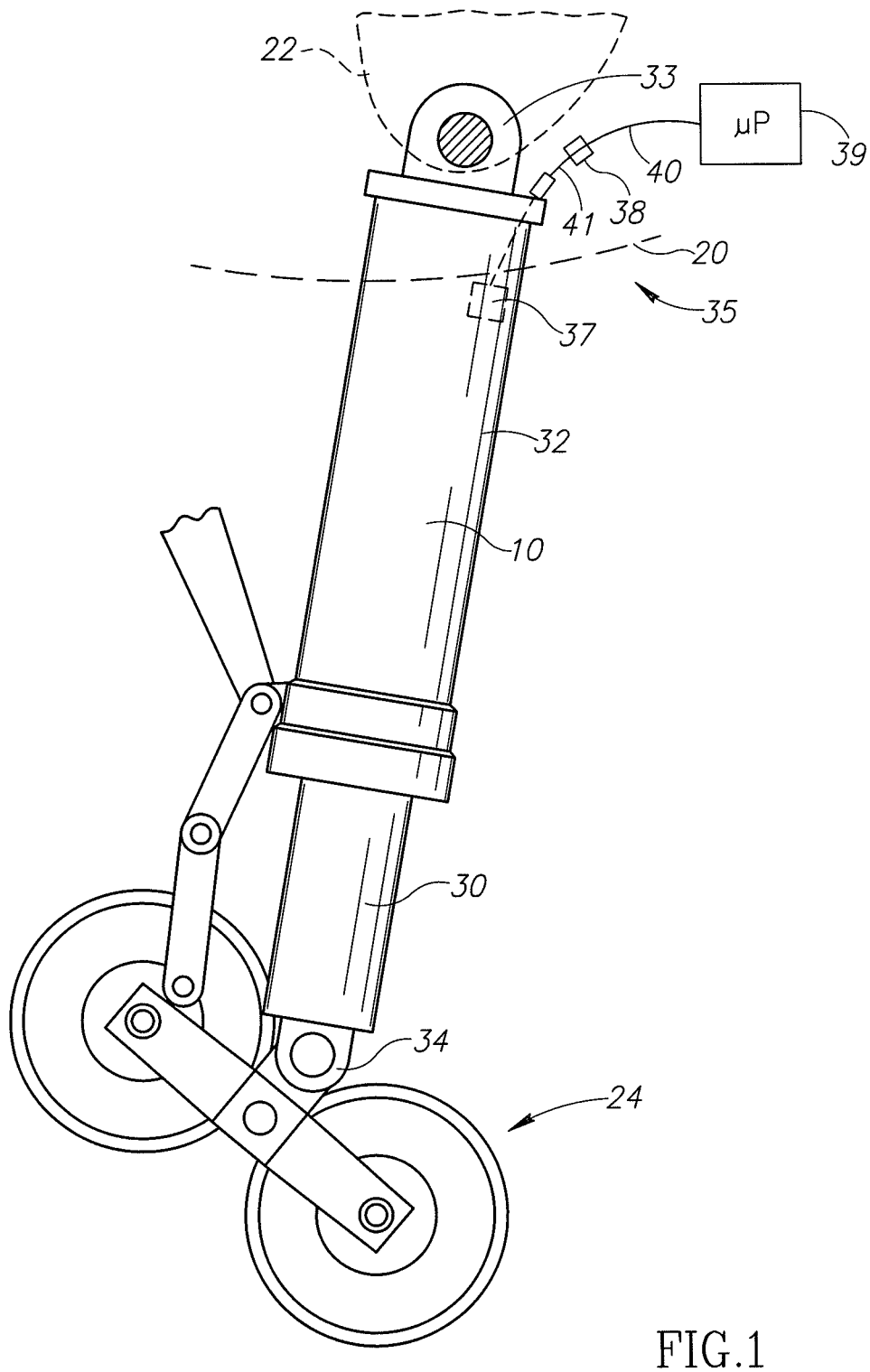
FIG. 1 is a schematic elevation view of a simplified landing gear assembly incorporating a shock strut in accordance with an embodiment of the present invention.

FIG. 1 presents a simplified aircraft shock strut 10, shown mounted at an upper end to an aircraft structure 20 by an attachment member 22. Any of a number of types of struts (or shock absorbers) may be used in accordance with the present invention, provided that they involve an internal working fluid. A wheel assembly 24 is attached to a lower end of the shock strut 10. The aircraft structure 20, attachment member 22, and wheel assembly 24 are shown in simple or outline form, while other structures such as locking mechanisms and retracting mechanisms are not shown in FIG. 1 in order to avoid obscuring the shock strut. Various arrangements of such structures are known in the art and are not critical to the description or understanding of the invention.

The shock strut 10 includes a piston 30 and a cylinder 32 which may be cylindrical as is customary, or some other shape if desired. The cylinder and piston respectively have one or more mounting tabs (eyes) 33 and 34 for attachment to the aircraft structure 20 and the wheel assembly 24. The piston 30 communicates forces to and from the wheel assembly 24. The cylinder 32 receives the piston 30 in a manner that permits relative telescoping movement between the cylinder 32 and the piston 30 to absorb and dampen shock forces from being transmitted to the aircraft structure 20.

In accordance with the present invention, a sensor assembly or detector 35 is provided for sensing or detecting a condition of a level of a liquid contained within the strut 10 (as in the manner hereinafter described) and outputting a signal related to the liquid level. In the illustrated embodiment, the detector 35 includes a probe assembly 37 extending into the strut and a transmitter/receiver or sensor unit 38 located outside the strut for transmitting/receiving signals to/from the probe assembly. The sensor unit 38 communicates the signal from the probe assembly 37 to a computer, processor or other logic device 39 for analyzing the signal and for determining a condition of the amount of liquid in the strut 10.

The processor 39 may have a memory and software associated therewith to carry out monitoring operations, and may be located near the strut 10, may be remote from the strut or may be a combination with some processing and/or data storage occurring near the strut and other processing and/or data storage occurring at another location. The processor also may be coupled to a display (not shown), which may be on the flight deck or in the wheel well, or may be connected by maintenance personnel as needed. The processor 39 can communicate with the sensor unit 38 via an electric or optical cable 40, or by other means such as a radio frequency transmitter and receiver, or other device.

While the sensor unit 38 may be connected to the processor 39 via electrical means, preferably the probe assembly 37 is an optical device that communicates with the sensor unit 38 via an optical cable 41. This advantageously avoids introduction of electrical signals into the interior of the strut. In one embodiment, a capacitance sensor may be used to determine how much liquid remains in the strut 10.

Figure 2:
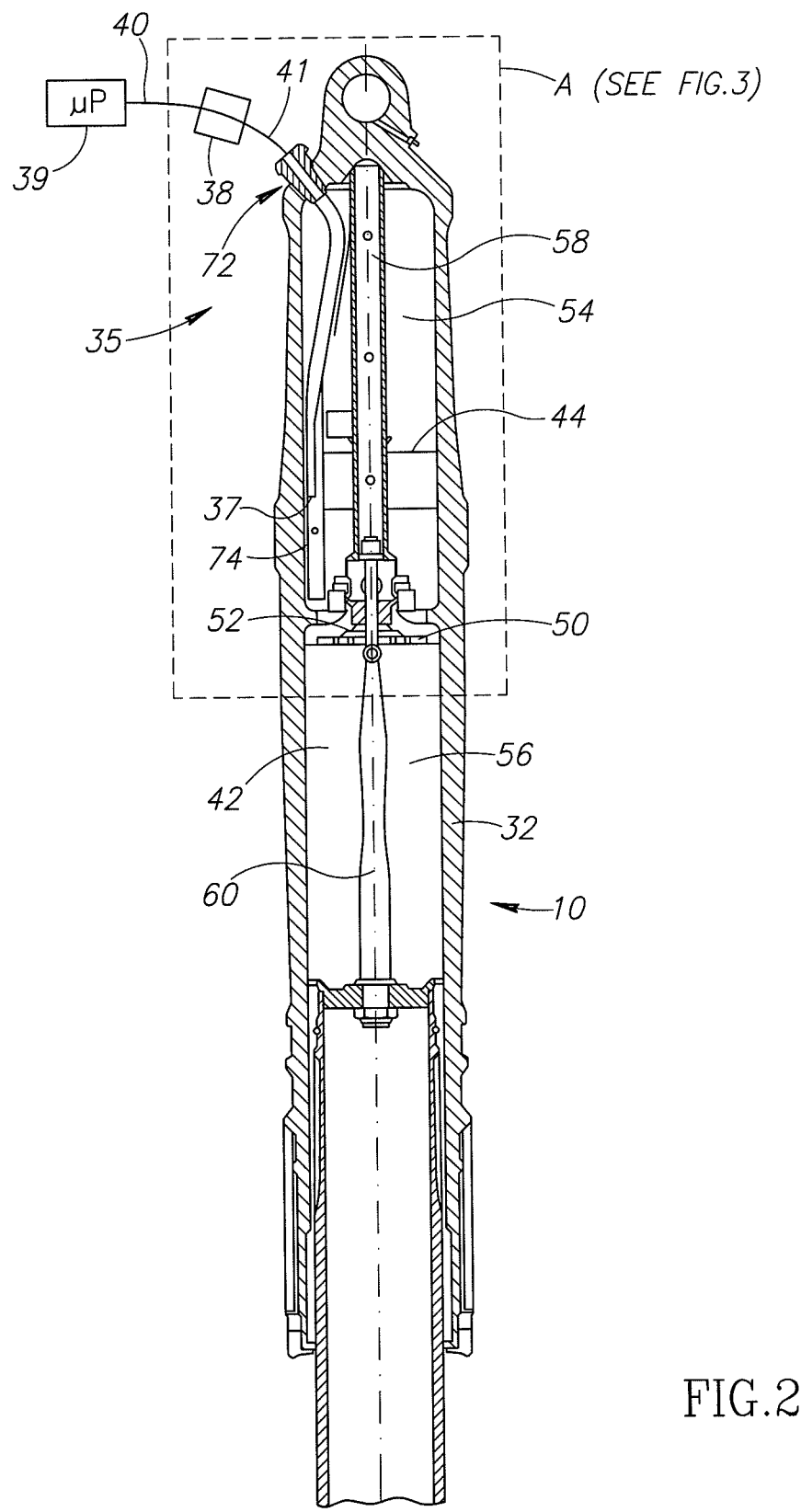
FIG. 2 is a partial cross-sectional view of a shock strut in accordance with an embodiment of the present invention.

Referring now to FIG. 2, the piston 30 and the cylinder 32 of the shock strut 10 define a sealed elongate chamber 42 at least partially filled with a liquid, such as hydraulic fluid or oil. The liquid preferably is filled to a nominal or full level, indicated by the line 44. A portion of the chamber 42 is filled with a gas, such as nitrogen, as is common in an air-over-oil type of shock strut. The gas generally is pressurized and the chamber 42 is sealed to provide a pressurized environment inside the chamber relative to the atmosphere outside the strut 10. Various sealing arrangements that allow telescoping movement between the piston 30 and the cylinder 32 while maintaining a seal are well known.

The illustrated shock strut 10 also includes an orifice plate 50 within the chamber 42 that has an orifice opening 52 passing therethrough. The orifice plate divides the chamber 42 into a pneumatic chamber 54 that has a gas in the upper portion thereof and a dynamic liquid chamber 56 that is partially defined by the piston 30 and which generally is filled with a liquid. The latter chamber may be referred to as the dynamic oil chamber 56, since oil often is used as the liquid.

A metering tube 58 may be mounted in the pneumatic chamber 54 between an end wall of the cylinder 32 and the orifice plate 50. A metering pin 60 is mounted to the end of the piston 30 and extends into the orifice opening 52 as the piston 30 is telescopically compressed into the cylinder 32. The metering tube 58 guides the metering pin 60 and generally keeps the pin centered in the orifice opening 52. The metering pin 60 regulates the size of the area through which the liquid can flow, thereby increasing the resistance to further compression and regulating the extension of the piston 30 when the compression force is removed or reduced.

Figure 3:
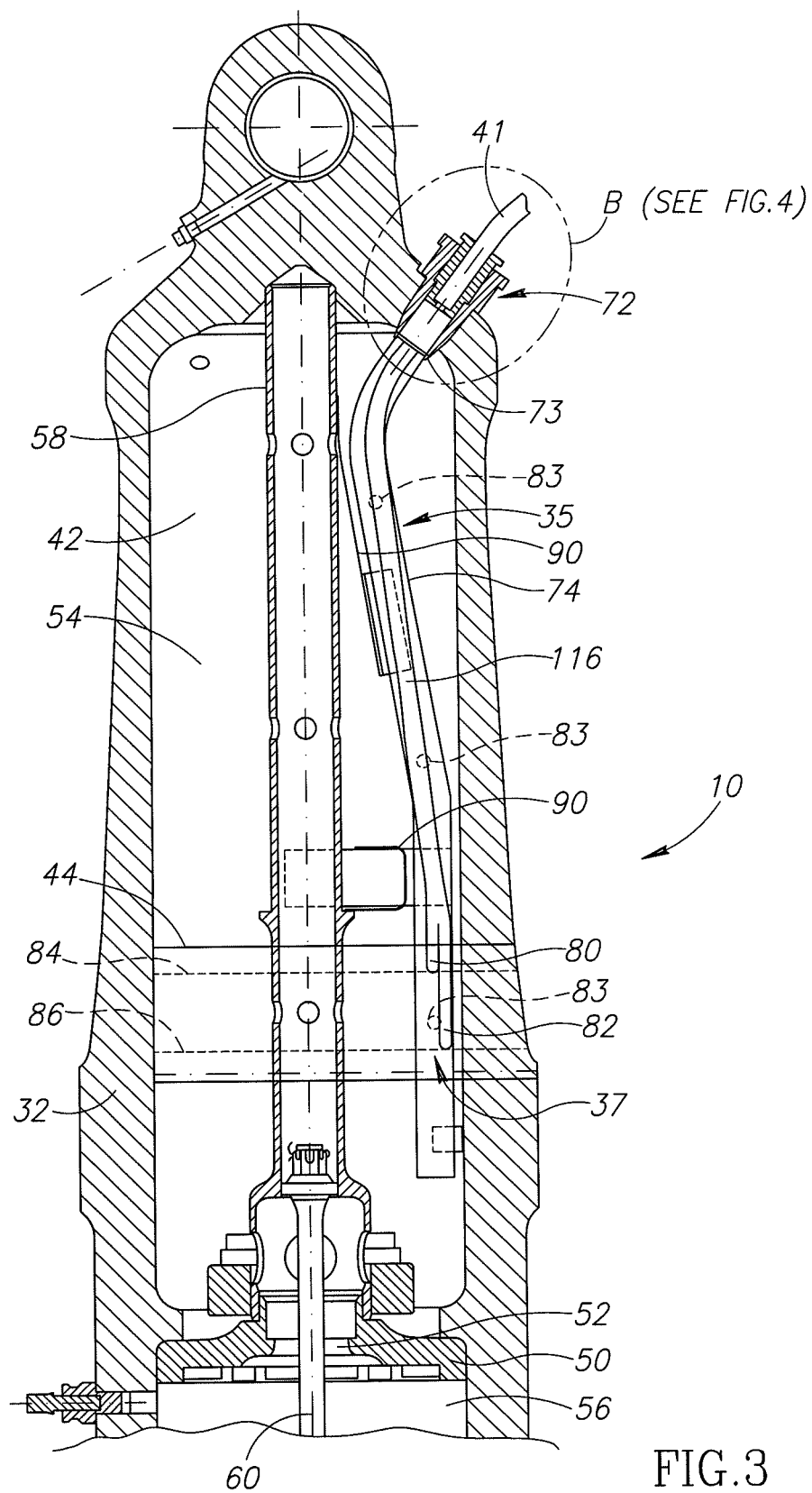
FIG. 3 is an enlarged cross-sectional view of an upper end of the shock strut of FIG. 2 in area A.

In FIGS. 2 and 3, details of an exemplary detector 35 are shown. The probe assembly 37 includes probes 80, 82 and the cable 41 for connecting the probes to the sensor unit 38. The cable is sealed by a pressure fitting assembly 72 to the wall of the strut 10 at an opening in the wall through which the probe assembly 37 passes. A guide tube 74 is mounted by suitable means within the chamber 42, and preferably extends from the interior or pressurized end of the pressure fitting assembly 72. The pressure fitting and guide tube are discussed below in greater detail.

In the illustrated embodiment, the probe assembly 37 includes two probes 80 and 82. The probe 80 functions to detect the presence or absence of liquid at a first location, indicated at 84. The second probe 82 functions to detect the presence or absence of liquid at a second location, indicated at 86, which represents a lower liquid level that may be outside the range of specified acceptable liquid levels. For example, when liquid is no longer detected at the first liquid level 84, an indication may be given that the strut should be serviced, perhaps within the month. When liquid is no longer detected at the second, lower liquid level 86, an indication may be given that the strut needs service sooner, perhaps right away before the next flight or within the week. Such detection can be effected by sensing either the presence or absence of liquid at a given level, depending on the type of probe and its orientation relative to the fluid level in the strut.

As above mentioned, the probes 80 and 82 preferably are fiber optic probes. The sensing end or tip of each probe includes a retro-reflector or retro-reflective corner cube prism exposed to the fluid in the pneumatic chamber 54. When the tip of the probe is covered by liquid, the amount of light reflected is minimal or zero because the relative indices of refraction of the liquid and the tip of the probe are similar. However, in the absence of liquid, a light signal transmitted from the sensor unit 38 to the probe is substantially completely reflected, thereby indicating the absence of liquid at the tip of the probe.

An exemplary sensor unit 38 is the Mini Beam™ system from Banner Engineering Corporation of Minneapolis, Minn., USA. The sensor unit 38 interfaces electrically or electronically with the processor 39. The sensor unit 38 also acts as a transmitter/receiver that sends and receives optical or light signals to and from the fiber optic probe assembly 37 along respective optical leads or fibers 73. Additionally or alternatively, a sensor unit made by Keyence Corporation may be used.

The probes 80 and 82 are connected to the sensing unit 38 by the cable 41 which includes optical fibers 73 for channeling light from the sensing unit 38 to the probes 80 and 82 and reflected light from the probes 80 and 82 to the sensing unit 38. In the illustrated embodiment, the optical fibers 73 are continuous, but it will be appreciated that each fiber may be composed of two or more segments that connect the sensing unit 38 to the probes 80 and 82.

In the illustrated embodiment, proper positioning of the probes 80 and 82 within the chamber 42 is effected by the guide tube 74. The guide tube 74 also helps keep the probes 80 and 82 and the optical fibers 73 within the chamber 42 away from moving parts of the strut 10. However, other means for positioning and restraining the probes 80 and 82 could be used in place of the guide tube 74. The guide tube 74 also facilitates installation and/or replacement of the probe assembly 35 as will be explained in a subsequent paragraph.

The lower end of the guide tube 74 preferably is submerged in the liquid in the chamber 42 and has a bottom opening and/or several lateral openings 83 communicating with upper portion of the chamber 42, thereby to allow the liquid to pass into and out of the guide tube 74 for contacting the probes 80 and 82 allowing the level in the guide tube to assume the same level as the balance of the liquid in the balance of the chamber 42. The guide tube 74 has a diameter which is much less than the diameter of the chamber 42, and thus the liquid in the guide tube is subject to less wave action and reduced amplitude wave action in reading to shock and vibration forces applied to the shock strut 10. However, liquid sensing usually will take place when the aircraft is in flight and the landing gear are extended, at which time wave action will be minimal.

Figure 4:
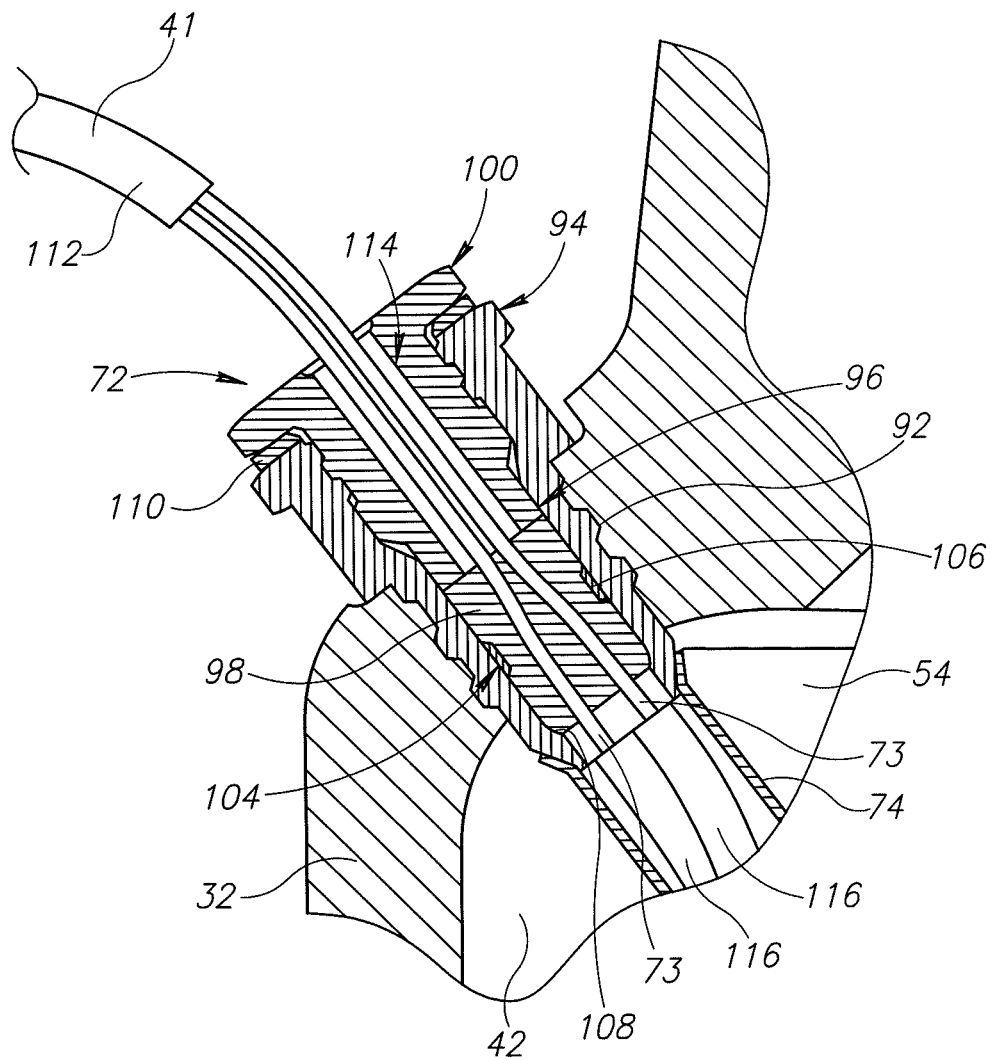
FIG. 4 is an enlarged cross-sectional view of a fitting in the shock strut of FIG. 3 in area B.

The guide tube 74 has one or more spring tabs 90 that hold the guide tube 74 in place in the chamber 42, although other means for securing the guide tube could be used, including a welded attachment, bolts or rivets. In the illustrated embodiment, several spring tabs 90 help brace the guide tube 74 between the wall of the cylinder 32 and the metering tube 58. As seen in FIGS. 3 and 4, the upper end of the guide tube 74 is flared for closely mating with a tapered end of a tubular fitting 94 forming part of the fitting assembly 72.

The illustrated pressure fitting assembly 72 includes the tubular fitting 94 that is mounted, as by threading, in a threaded hole 92 in the wall of the cylinder 32. A packing (not shown) or other suitable sealing means may be interposed between the fitting 94 and the sides of the hole 92 to provide a further seal.

The tubular fitting 94 has a through passage 96 in which a plug 98 is received and sealed by an O-ring 106 or other suitable means. In particular, the plug 98 has an annular groove 104 for receiving the O-ring 106 for providing a sealed interface between the plug 98 and the fitting 94. The through passage 96 and plug 98 preferably are cylindrical. The plug 98 is located between a shoulder 108 formed by a reduced diameter end portion of the through passage 96 and a retainer 100 that is screwed into or otherwise removably fastened to the fitting 94 for retaining the plug 98 in the fitting. Both the fitting 94 and the retainer 100 may be provided with hexagonal head portions to facilitate installation. Also, an annular seal and/or washer 110 may be interposed between a head flange of the retainer 100 and outer end surface of the fitting 94, as shown. In an alternative arrangement, the fitting 94 could be formed as an integral part of the cylinder 32, in which case it obviously would not be removable.

The plug 98 preferably is molded to the cable 41. More particularly, the plug is molded directly to the optical fibers 73 passing therethrough. The optical fibers are transversely spaced from one another so that each fiber is surrounded by the plug material molded thereabout. This arrangement provides an effective seal between the plug 98 and each fiber 73 without significantly degrading the operation (preferably no greater than 10% light transmission degradation) of the optical, fibers. Although less desirable, the plug 98 could be molded directly to a sheath on the optical fiber.

Externally of the fitting assembly 72, the optical fibers are protected by a sheath 112. In FIG. 4, the sheath 112 is shown broken away, but preferably extends into a through bore 114 in the retainer 100 through which the optical fibers 73 pass. The optical fibers 73 extend from the fitting 94 into the guide tube 74 and terminate at the probes 80 and 82 for conveying signals to and from the sensor unit 38 (FIG. 2) as above described. The fibers 73 can be individually sheathed, or as shown the fibers associated with a respective probe can pass through a protective tube 116.

As will be appreciated, the foregoing arrangement enables easy replacement of the probe assembly 35. To remove the probe assembly, the retainer 100 is removed from the fitting 94. This allows the entire probe assembly 35 to be withdrawn from the guide tube 74 by simply pulling the plug 98 and optical fibers 73 out of the fitting 94 and the guide tube. A replacement assembly can be installed in a reverse manner, inserting the optical fibers 73 with the probes 80 and 82 at the end thereof into the guide tube 74 which guides the optical fibers and the probes into position and finally pushing the plug 98 into the fitting 94, after which the retainer 100 can be reinstalled. It is noted the reduced diameter portion of the through passage 96 in the fitting 94 is sized to permit passage therethrough of the optical fibers 73 and any protective sheathing or tubes 116.

A gas fitting (not shown) also may be provided in the wall of the cylinder 32 to provide access for a pressure transducer and the addition of gas. Pressure data developed by the transducer also can be communicated to the processor 39.

In operation, compression of the shock strut 10 causes the piston 30 to move into the cylinder 32 thereby reducing the volume of the chamber 42 and compressing the portion filled with gas. The compressed gas stores energy in a manner similar to a spring. Relative telescoping movement of the piston 30 into the cylinder 32 pumps liquid from the generally lower dynamic liquid chamber 56 through the orifice plate 50 into the pneumatic chamber 54 as the shock strut 10 is compressed, thereby increasing resistance to compression through fluid amplification while simultaneously dissipating compression energy. As the piston 30 moves into the cylinder 32, the metering pin 60 moves into the orifice opening 52 in the orifice plate 50, effectively reducing the flow area through the orifice opening 52 and increasing resistance to further compression.

Part of the work expended in compressing the shock strut 10 is stored as recoverable spring energy in the portion filled with gas which resiliently suspends the aircraft structure 20 (FIG. 1) while taxiing on the ground, and which also allows the piston 30 and the cylinder 32 to return to an extended position after the compression force is removed, such as after takeoff.

The detector 35 monitors the liquid level. As above indicated, usually such monitoring is effected when the aircraft is in flight and when the strut 10 is in a fully extended position, as when the landing gear are extended. When the liquid level drops below the threshold level 84 or 86 as sensed by the detector 35, the processor 39 may initiate an audible, visual or other alarm for alerting personnel to check the liquid level.

Specifically, the system detects the condition of the liquid level when the strut 10 is in a fully extended position and the aircraft is in flight. This avoids the need to compensate for the change in liquid level that occurs when the strut is compressed, i.e., not fully extended. Since the strut reaches the fully extended position once the aircraft leaves the ground for flight or when the strut is deployed in preparation for landing, the probes 80 and 82 are best positioned to determine the condition of the liquid at those times.

The processor 39 may receive a signal indicating that the aircraft has left the ground or that the landing gear has been deployed for landing. At that time, the processor 39 would activate the sensor unit 38 to send a beam of light through the optical fibers 73 to each respective probe 80, 82. In the absence of liquid, the light will be reflected back through the return fiber. In the presence of liquid, no light is reflected. The sensor unit 38 indicates whether return light was observed and this is communicated to the processor 39. Reflected light received from both probes 80 and 82 indicates the liquid level is unacceptably low. Reflected light received from only the shorter probe indicates that the liquid is low but still acceptable. Minimal reflected light would indicate that the strut 10 has the proper fluid level. The processor 39 stores the data for retrieval by maintenance personnel and/or may provide an alert, such as illuminating a light in the cockpit to be observed by flight personnel and/or in the wheel well to be observed by the ground crew after the flight and/or before the next flight. Those skilled in the art will also appreciate that additional probes may be used to provide additional level readings as may be desired.

If desired, advantage can be taken from the occurrence of intermittent signals that will occur during sensor monitoring when the oil level is near the level of a probe. This is illustrated in FIG. 5 and the following table:

| | High-Probe Low Oil | Low-Probe-Adversely Low Oil | Interpretation |
|---|---|---|---|
| 161 | Consistent reading of "In-Oil" | Consistent reading of "In-Oil" | Proper all level |
| 162 | Intermittent readings of both "In-Oil & "Out-of-Oil | Consistent reading of "In-Oil" | Oil level becoming low |
| 168 | Consistent reading of "Out-of Oil" | Consistent reading of "In-Oil" | Oil level is low. Service needs to be scheduled. |
| 166 | Consistent reading of "Out-of-Oil" | Intermittent reading of both "In-Oil" & "Out-of-Oil" | Oil level is becoming adversely low. Service needs to be scheduled soon. |
| 167 | Consistent reading of "Out-of-Oil" | Consistent reading of "Out-of-Oil" | Oil level is adversely low. Service immediately |

Figure 5:
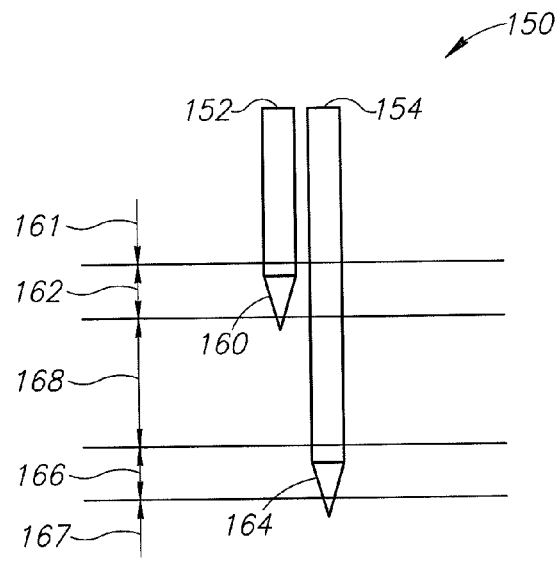
FIG. 5 is a schematic illustration of the high and low probes with associated sensitivity ranges.

The intermittent readings arise from the oil level being within the sensor sensitivity range as depicted in FIG. 5, which is described below.

Figure 7:
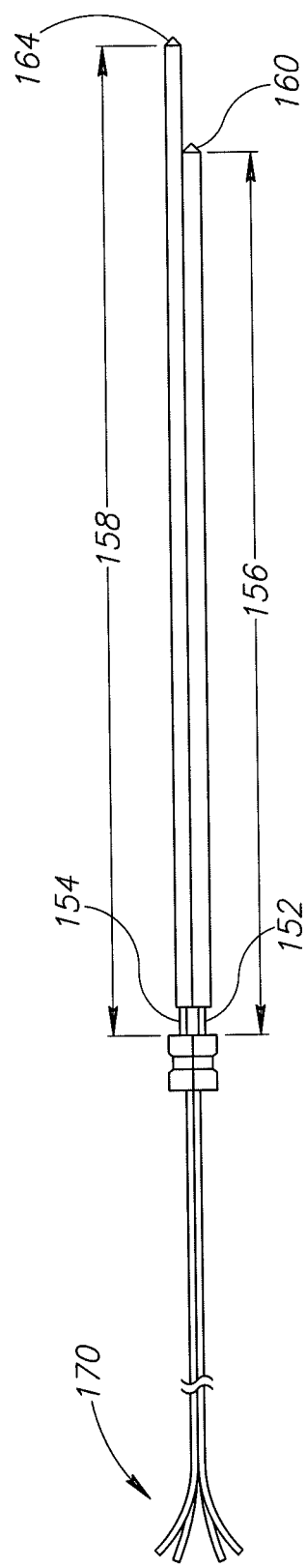
FIGS. 7-11 show another implementation of a shock strut with level detection.

Referring the table above and to FIGS. 5 and 7, a probe assembly 150 includes at least two probes identified as a first probe 152 and a second probe 154. The first probe 152 (e.g., shorter probe) extends into the chamber 42 (FIG. 2) of the shock strut 10 (FIG. 1) by a first distance 156 and the second probe 154 (e.g., longer probe) extends into the chamber 42 by a second distance 158. The first probe 152 includes a first probe tip 160 for sensing a first level 84 (FIG. 3) of the liquid in the chamber 42. Further, the first probe 152 is configured to transmit signals indicative of when the first level 84 of the liquid is within a first sensitivity range 162 of the first probe tip 160. The second probe 154 includes a second probe tip 164 for sensing a second level 86 (FIG. 3) of the liquid in the chamber 42. Likewise, the second probe 154 is configured to transmit signals indicative of when the second level 86 of the liquid is within a second sensitivity range 166 of the second probe tip 164. In one embodiment, the first and second probe tips 160, 164 are separated by a desired distance.

Referring more specifically to the table above, various readings of the probes 152, 154 may be obtained or interpreted depending on whether the respective probe tips 160, 164 are substantially beneath the liquid level. A first reading 161 indicating that the oil level is proper occurs when both probe tips 160, 164 are checked and found to be below the liquid level. The second reading 162, which the same as the first sensitivity range 162 of the first probe tip 160, provides an interpretation that the oil level is becoming low because the first or shorter probe 152 transmits intermittent signals. A third reading 168, which corresponds to the desired distance described above, provides an interpretation that the oil level is low and requires service because the first or shorter probe 152 transmits a consistent low-oil level signal. The fourth reading 166, which the same as the second sensitivity range 166 of the second probe tip 164, provides an interpretation that the oil level has become adversely low because the first or shorter probe 152 transmits a signal that it is above the oil level while the second or longer probe 154 transmits at least an intermittent signal. The final reading 167 provides an interpretation that the oil level is adversely low and should be serviced immediately.

FIGS. 5-11 further operate to describe methods of monitoring liquid levels in an aircraft shock strut 10 of a landing gear system. In one embodiment, the figures describe a prognostics and health management system that utilizes the readings from oil level probes on a strut to accomplish various tasks. By way of example, the system may monitor and report current status (readings are taken after weight-on-wheels signal registers that the aircraft is in the air and the pilot has selected to retract the landing gear). The readings by the system may be used to assess current oil levels and this information may be stored and analyzed for trends, which in turn may be used to prognosticate future maintenance needs. One trend that may be observed from the information and analysis is the slow lowering of oil levels that initially provide intermittent low readings which become steadier over time. In one embodiment, the information may be obtained by taking fluid level readings at two known different states (relative to oil level) such that the health of the fibers and sensors can be determined. For this to be effective, the probe tips are situated within the strut such that in the gear retracted position the probes are not submerged in oil and when the gear is deployed and at the static position (weight-on-wheels) the probes are submerged in oil. Comparing the readings taken at these two positions, for example, may indicate whether there is a problem with the sensor or with the fibers.

Referring back to FIGS. 2 and 7, the system may include detecting a liquid level with the probes 152, 154 that extend into the shock strut 10. The respective probe tips 160, 164 extend into the chamber 42 of the shock strut 10 by different distances 156, 158. The probe tips 160, 164 each have respective liquid level sensitivity ranges as discussed above. The probe tips 160, 164 are arranged to be in submergible contact with the liquid when the shock strut 10 is in a static, deployed configuration and then be out of submergible contact with the liquid when the shock strut is in a retracted position. Signals indicative of a present level of the liquid are transmitted from the probes 160, 164 to a processor, such as the processor 39 (FIG. 1). The processor 39 compares the transmitted signals to previously transmitted signals indicative of a previous level of the liquid. Based on this comparison and referring to FIG. 5, it can be determined whether the present level of liquid is between the sensitivity ranges 162, 166 of the respective first and second probe tips 160, 164.

Figure 6:
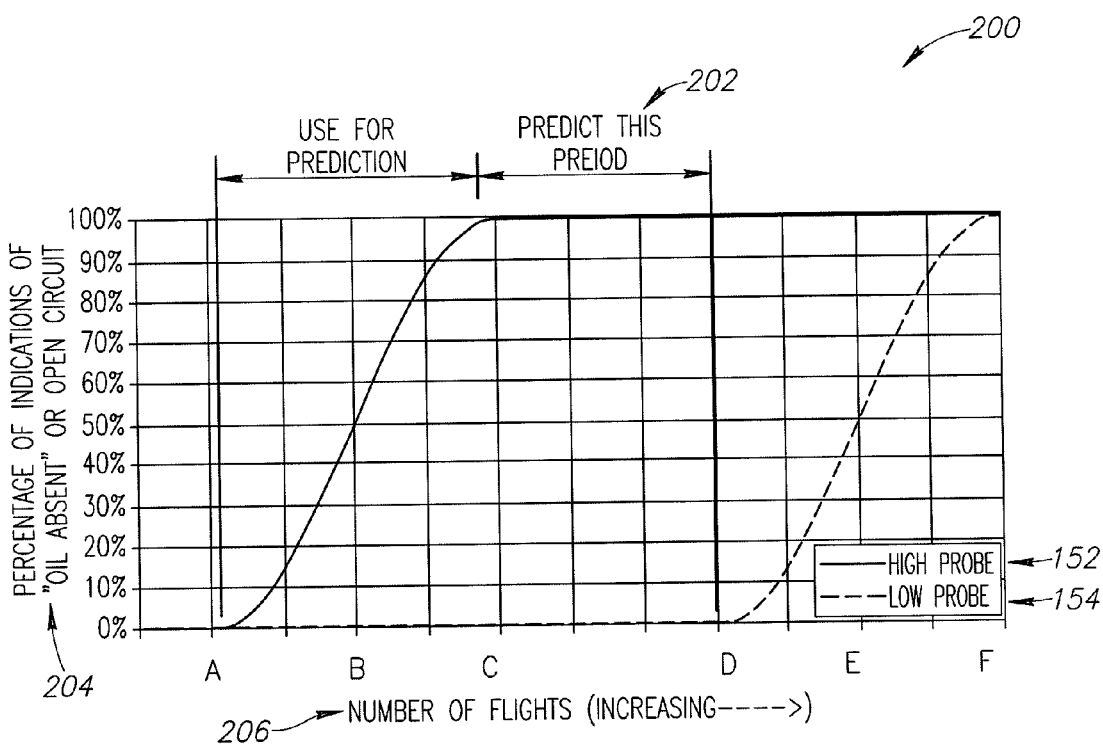
FIG. 6 is a further illustration of fluid level sensor indications.

FIG. 6 shows a table 200 indicating how the transmitted signals from the plurality of probes 120 may be interpreted by the processor 39 to provide a prediction 202 based on a percentage of oil absent 204 with respect to the liquid level for the probes 152, 154 (e.g., high and low probes) over a number of flights 206 completed by the landing gear system. In one embodiment, the probes 152, 154 and processor 39 may operate as a prognostic oil leak system. Generally, a sudden landing gear strut seal failure is evidenced by liquid (e.g., oil or hydraulic fluid) on the ground at a parked location of the aircraft or may be evidenced by liquid on the landing gear for in-flight seal failures. However, slow leaks are more difficult to observe because any leaking liquid is generally blown off during each takeoff, flight and landing event. Generally, periodic checks of the internal strut pressure versus stroke at a static position may be used to indicate a low gas pressure and/or a low liquid level, but without observable leakage any negative results are often assumed to be a gas leak only.

As a result, the internal strut pressure is usually corrected for a particular stroke position without regard to the liquid level. However, such a repeated correction may eventually lead to insufficient liquid present in the strut to adequately absorb a high sink rate landing or a sudden free extension of the piston. With the two probes 152, 154 arranged as schematically shown in FIG. 5, the liquid will undergo a transition period through the sensor sensitivity ranges 162, 166 of the respective first and second probe tips 160, 164. In one embodiment, when the liquid is in a vicinity of one of the probe tips 160, 164 then a sensor within the probe tip may provide a reading of "oil present" part of the time and a reading of "oil absent" part of the time. Accordingly and as provided by example in FIG. 6, the transition period through the sensor sensitivity ranges 162, 166 may be used to estimate a liquid loss rate and predict how many more flights may be flown before encountering an undesirable "low oil" condition.

Figure 8:
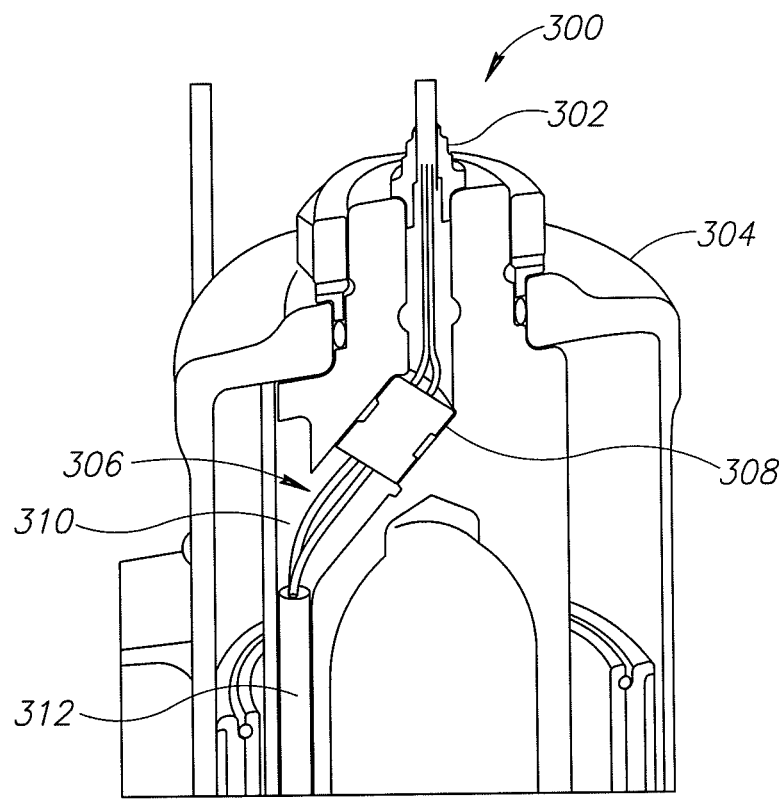
Figure 9:
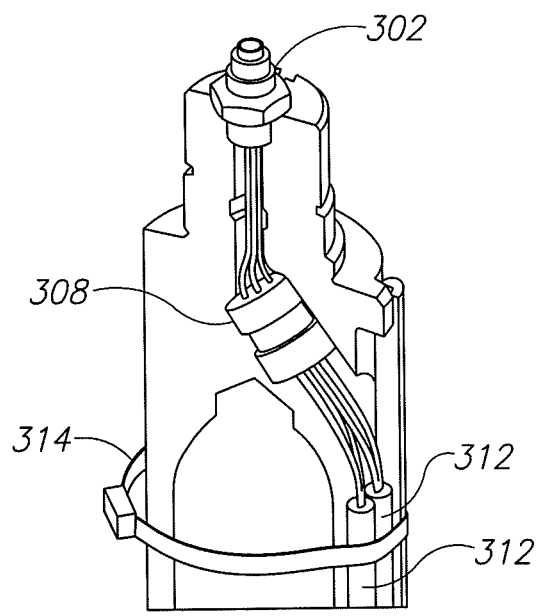
Figure 10:
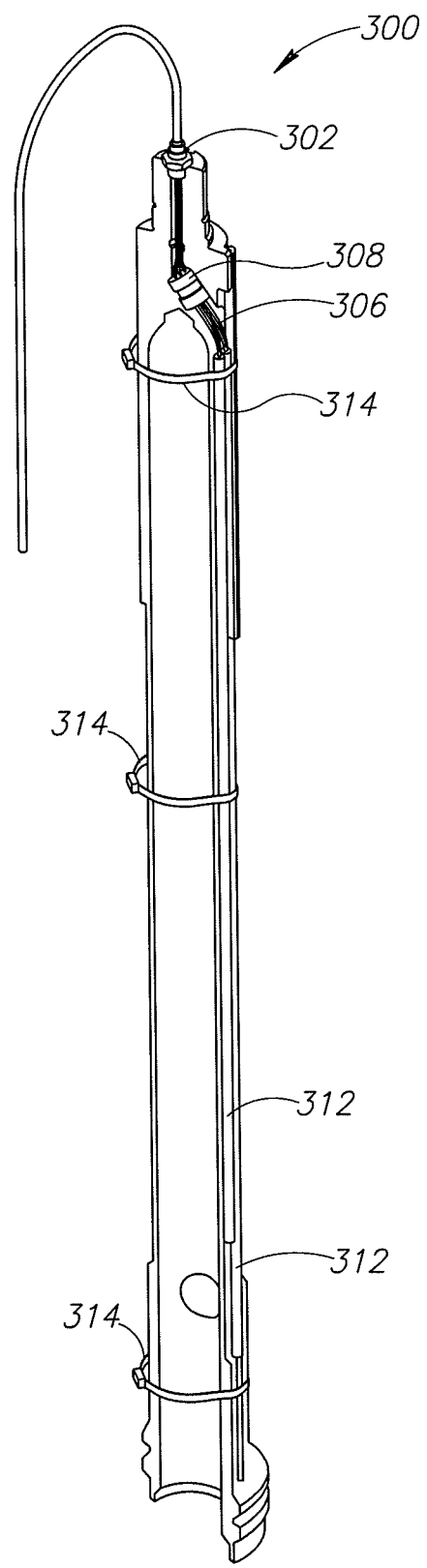

FIGS. 8-10 show a plug a liquid level sensing system 300 having a fitting 302, which may be similar to the tubular fitting 94 described above, coupled to a shock strut 304 and configured to receive a plurality of probes 306. A separator 308, which may take the form of a second plug, is positioned downstream in a chamber 310 of the shock strut 304 to affect a spaced apart relationship of the probes 306 as they pass through the separator 308. In addition, the probes 306 may then extend into respective guide tubes 312 mounted within the chamber 310. One or more guide tubes 312 may be coupled to the to the shock strut 304 with a fastening mechanism 314, which may take the form of a cinchable strap.

Figure 11:
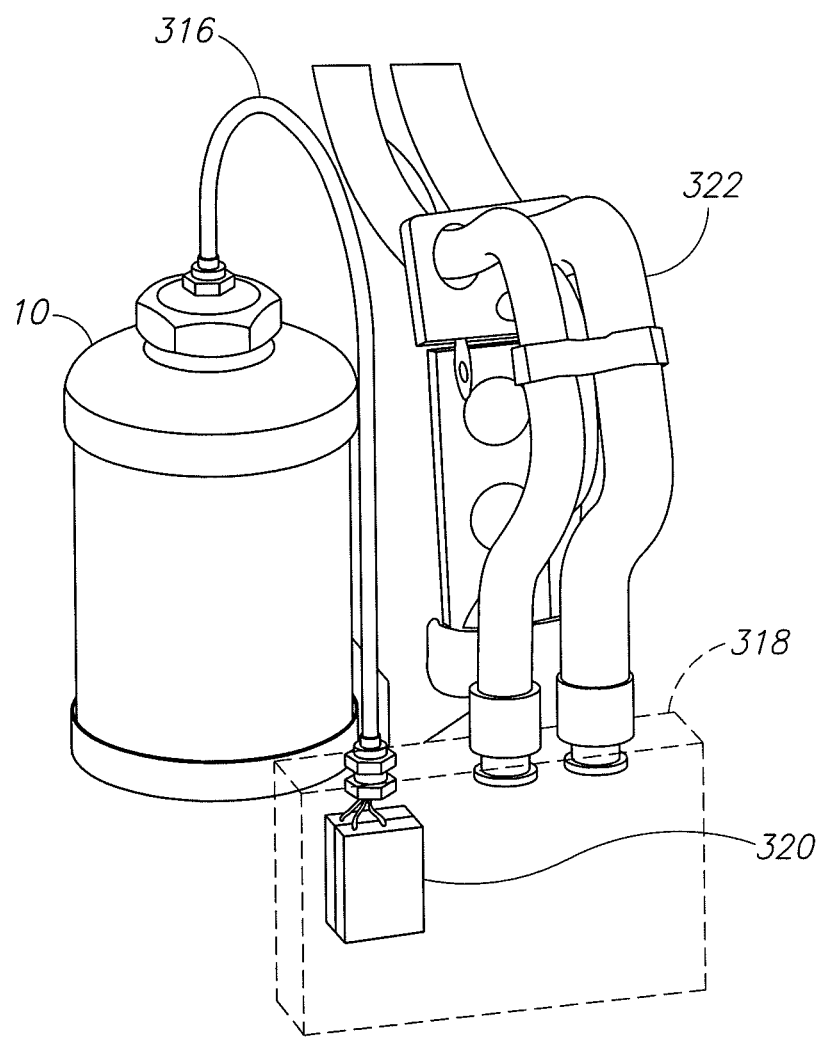

FIG. 11 shows a sheath 316 extending from a top portion of the shock strut 10 and into a junction box 318 for the landing gear electronics. The junction box 318 houses the sensor 38 and may also house the processor 39. The junction box 318 may also function as the interface for other electrical connectors 322 to and from the aircraft.

Figure 12:
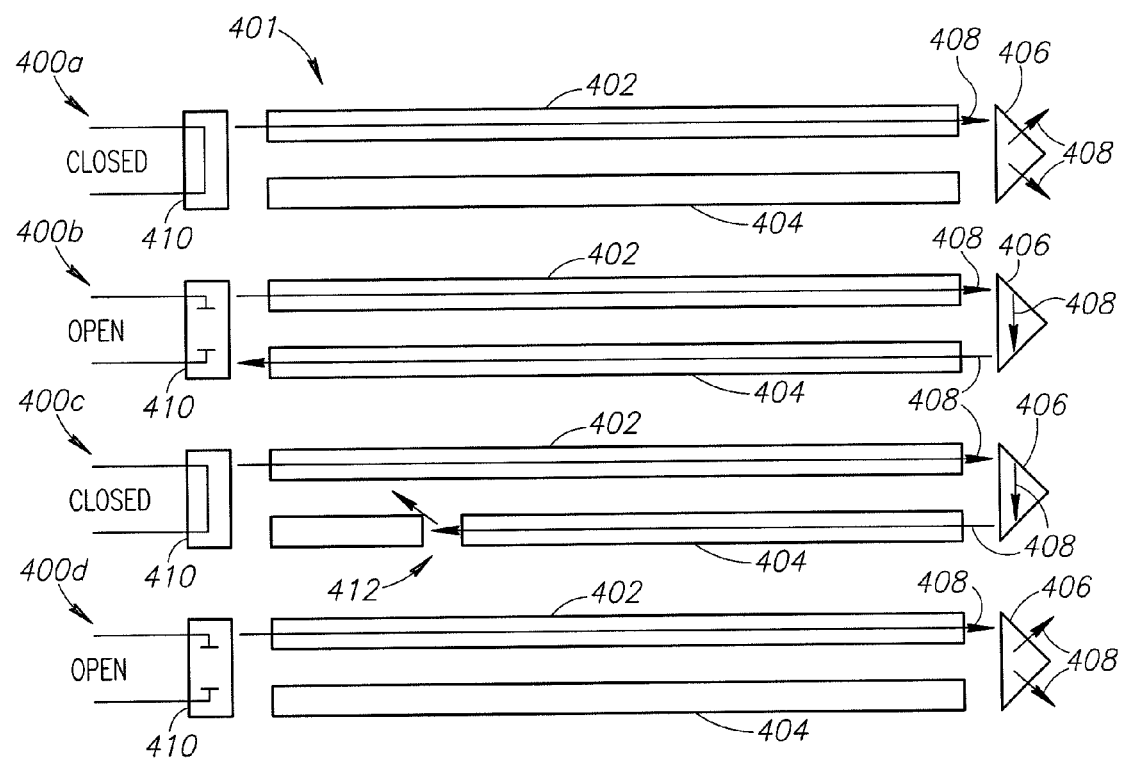
FIG. 12 is a schematic diagram showing sensor indications for four possible fiber or sensor conditions.

FIG. 12 schematically shows four different readings 400a, 400b, 400c and 400d obtainable by a fluid level sensor 401 th at includes a first optical fiber 402 optically coupled to a second optical 404 through a probe tip 406, which may take the form of a prism. In the first reading 400a, which indicates a liquid present condition, a light beam 408 is transmitted through the first optical fiber 402 while the probe tip 406 is submerged in a liquid (i.e., liquid level is above the probe tip 406), which in turn results in the light beam 408 being dispersed into the liquid with minimal to no reflection of the light beam 408 back through the second optical fiber 404 and toward a functional light sensor 410 providing a closed circuit.

In the second reading 400b, which indicates a liquid absent condition, the light beam 408 is transmitted through the first optical fiber 402 while the probe tip 406 is out of the liquid (i.e., liquid level is below the probe tip 406), which in turn results in the light beam 408 being sufficiently reflected back through the second optical fiber 404 and detected by the functional or non-functional light sensor 410 to provide an open circuit. To determine whether the probe tip 406 should be submerged in the liquid and thus whether the liquid level is adequate, a liquid level check may be performed on a particular strut during different phases of flight. For example, the fluid level sensor 401 should provide a reading of being "submerged" in the liquid when the aircraft is in a static position on the ground; whereas the fluid level sensor 401 should provide a reading of being "not submerged" when the landing gear is retracted during flight. Thus, a check of the fluid level sensor 401 at these two times should expectedly provide opposite readings. If these readings were not consistent with expected behavior, then a broken fiber may be suspected.

In the third reading 400c, which also indicates a fluid absent condition, the fluid level sensor 401 is checked at a known condition when the probe tip 406 should be out of, above or not submerged in the liquid. However, a broken fiber region 412 prevents the light beam 408 from reaching the functional light sensor 410 to provide a closed circuit. Thus, by performing repeated checks of the fluid level sensor 401 during various stages of flight a broken or damaged fiber may be detected. In one embodiment, a method of checking for damaged optical fibers includes the steps of (1) transmitting a light beam down a first fiber that is optically coupled to a second fiber by a reflecting mechanism such as a prism; (2) reflecting the light beam from the reflecting mechanism through the second fiber toward a light sensor; and (3) determining whether at least one of the fibers are damaged or broken by comparing the light sensor readings as described above.

In a fourth reading 400d, which indicates a fluid present condition, the probe tip 406 is submerged in the liquid, but the non-functional light sensor 410 provides an open circuit. Generally, the light sensors 410 operate as redundant sensors in an aircraft strut fluid level sensing system, thus if both sensors are operating properly and all conditions are normal then both sensors should provide the same output. For illustrative purposes however, the indications 400b and 400d are shown in the different configurations. The open circuit configuration may occur when a probe tip 406 is not submerged due to a low liquid level as in 400b or if the sensor 410 itself has failed as in 400d. To check for either the low liquid level or the failed sensor condition, at least three checks may be performed at different stages during a flight. By way of example, a first check may be performed before takeoff, a second check may be performed with the landing gear fully deployed (probe tips may or may not be submerged depending on the oil level within the strut), but just as retraction of the landing gear has been commanded, and a third check may be performed with the landing gear fully retracted (when both probe tips should not be submerged), preferably with the flight path being straight or slightly nose-up and generally level. If the first check indicates the open circuit at both sensors then an adversely low liquid level (e.g., sufficient liquid may be absent and such could be detected by a ground crew) or both sensors failed as in 400d could and should be assumed. The sensor 410a may cooperate with the processor 39 (FIG. 2) to provide a prompt, an alert or some other type of notification that the strut should be inspected within a selected period of time, for example before a next flight.

The closed circuit configuration 400a and 400c may be indicative of a probe tip 406 being sufficiently submerged in liquid or a broken fiber region 412 shown in 400c, the latter being an undesirable condition. Again, the configuration of the sensor and/or fibers may be checked by generating a liquid level reading at various known conditions as discussed above.

Although the invention has been shown and described with respect to certain illustrated embodiment, equivalent alterations and modifications will occur to others skilled in the art upon reading and understanding the specification and the annexed drawings. For example, although an embodiment of the invention directed to an aircraft strut is described, a shock absorber provided by the present invention may have other applications other than aeronautical applications. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiments of the invention.

The various embodiments described above can be combined to provide further embodiments. All of the above U.S. patents, patent applications and publications referred to in this specification, as well as U.S. patent application Ser. No. 10/671,425 entitled Aircraft Shock Strut Having a Fluid Level Monitor, are incorporated herein by reference in their entireties. Aspects can be modified, if necessary, to employ devices, features, methods and concepts of the various patents, applications and publications to provide yet further embodiments.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of monitoring a liquid level in an aircraft shock strut of a landing gear system, the method comprising:
   detecting a liquid level with a plurality of probes that extend into the shock strut, the plurality of probes having at least a first probe extending by a first distance and a second probe extending by a different distance into the shock strut, each probe having a probe tip with a respective liquid level sensitivity range;

transmitting signals from the probes to a processor, the signals indicative of a present level of the liquid;

determining whether the liquid level is within the sensitivity range of the first probe tip;

when the liquid level is within the sensitivity range of the first probe tip, monitoring an amount of time required for the liquid level to transition from one probe tip to about the other probe tip;

based on the amount of time, estimating a liquid loss rate per flight; and predicting an approximate number of flights remaining, based on the estimated liquid loss rate, before the liquid level reaches a lowermost threshold level.

2. The method of claim 1, wherein detecting the liquid level with the plurality of probes includes arranging the probe tips to be in submergible contact with the liquid when the shock strut is in a static, deployed configuration and arranging the probe tips to be out of submergible contact with the liquid when the shock strut is in a retracted position.

3. The method of claim 1, further comprising transmitting intermittent signals to the processor when the liquid level is proximate the first probe.

4. The method of claim 1, wherein transmitting the signals includes transmitting light through optical fibers coupled to the plurality of probes.

5. A method of monitoring a liquid level in an aircraft shock strut of a landing gear system, the method comprising:

detecting a liquid level with a plurality of probes that extend into the shock strut, the plurality of probes having at least a first probe extending by a first distance and a second probe extending by a different distance into the shock strut, each probe having a tip with a respective liquid level sensitivity range;

transmitting signals from the probes to a processor, the signals indicative of a present level of the liquid;

determining whether the liquid level is within the sensitivity range of the first probe tip;

when the liquid level is within the sensitivity range of the first probe tip, monitoring an amount of time required for the liquid level to transition from one probe tip to about the other probe tip; based on the amount of time, estimating a liquid loss rate per flight;

determining a number of flights from an initially identified flight to a subsequently identified flight based on the estimated liquid loss rate; and based on the number of flights, predicting the liquid level of a future flight occurring after the subsequently identified flight.

6. The method of claim 5, wherein detecting the liquid level with the plurality of probes includes arranging the probe tips to be in submergible contact with the liquid when the shock strut is in a static, deployed configuration and arranging the probe tips to be out of submergible contact with the liquid when the shock strut is in a retracted position.

7. The method of claim 5, further comprising transmitting intermittent signals to the processor when the liquid level is proximate the first probe.

8. The method of claim 5, wherein transmitting the signals includes transmitting light through optical fibers coupled to the plurality of probes.

* * * * *